United States Patent [19]

Braswell

[11] 4,181,605
[45] * Jan. 1, 1980

[54] WATER SOFTENING SYSTEM

[76] Inventor: John W. Braswell, Automatic Sani-Soft Water Service, Inc., 14 N. Sprigg St., Cape Girardeau, Mo. 63701

[*] Notice: The portion of the term of this patent subsequent to Aug. 8, 1995, has been disclaimed.

[21] Appl. No.: 914,512

[22] Filed: Jun. 12, 1978

Related U.S. Application Data

[63] Continuation-in-part of Ser. No. 699,215, Jun. 24, 1976, Pat. No. 4,104,165.

[51] Int. Cl.² .............................................. B01D 23/24
[52] U.S. Cl. .......................................... 210/19; 210/32; 210/35; 210/134; 210/140; 210/191
[58] Field of Search ...................... 210/19, 32, 35, 134, 210/136, 140, 191, 278

[56] References Cited

U.S. PATENT DOCUMENTS

| | | | |
|---|---|---|---|
| 3,063,937 | 11/1962 | McAuley | 210/35 |
| 3,347,785 | 10/1967 | Staats | 210/35 |
| 3,380,590 | 4/1968 | Grayson | 210/134 |
| 3,385,441 | 5/1968 | Lyall | 210/134 |
| 3,509,998 | 5/1970 | Pellett et al. | 210/134 X |
| 3,531,402 | 9/1970 | Thomspon | 210/35 |
| 3,779,281 | 12/1973 | Brane | 210/191 X |
| 4,104,165 | 8/1978 | Braswell | 210/19 X |

Primary Examiner—Charles N. Hart
Assistant Examiner—Richard W. Burks
Attorney, Agent, or Firm—Cohn, Powell & Hind

[57] ABSTRACT

The water softening system hereof employs a treatment tank containing a mineral bed of ion-exchange resin granules, a brine tank, and a valve for periodically cycling water through the mineral bed for removing hardness and other undesirable factors therefrom, then passing a diluted brine solution through the bed in an opposite direction to its normal service flow to recondition and flush the bed. The control for the system includes electrically operated solenoid diaphragm valves, and a plunger valve responsive to water pressures, for controlling and regulating the flow of water and brine through the mineral bed. A venturi aspirator is incorporated in the plunger valve, whereby a saturated brine solution is drawn and with controlled dilution is caused to flow in a direction opposite to service flow through the mineral bed.

8 Claims, 10 Drawing Figures

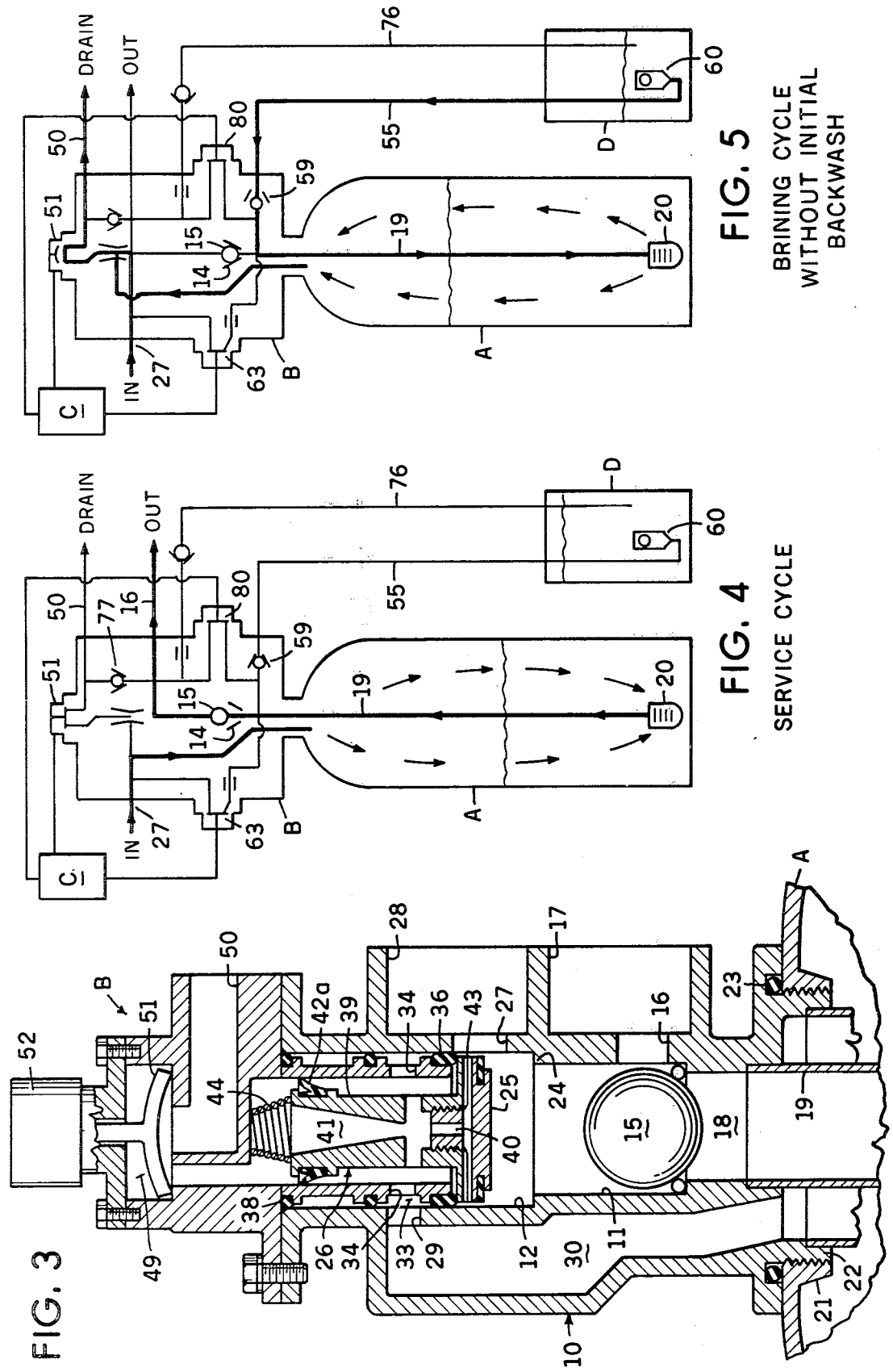

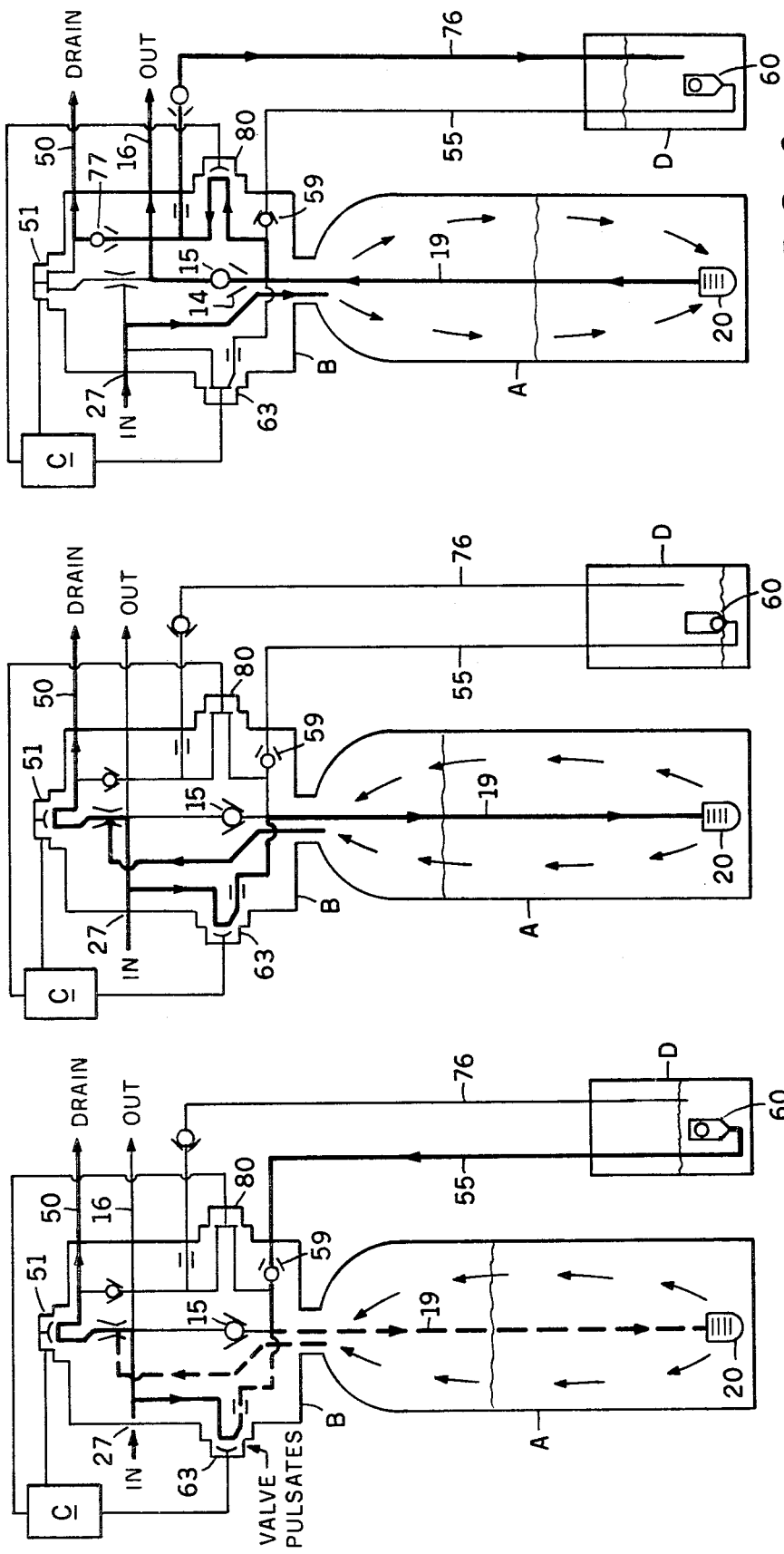

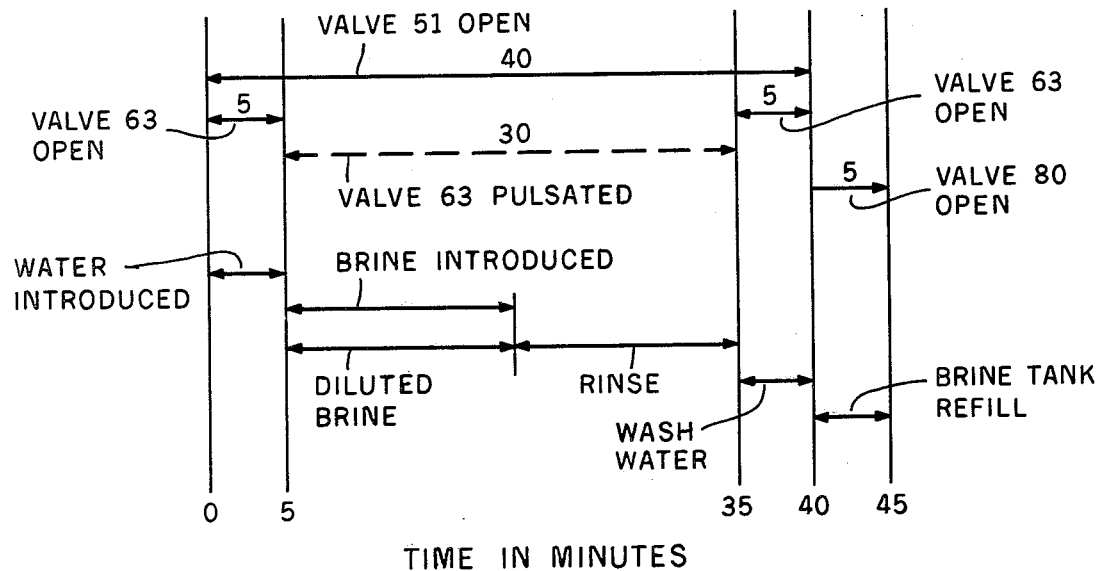
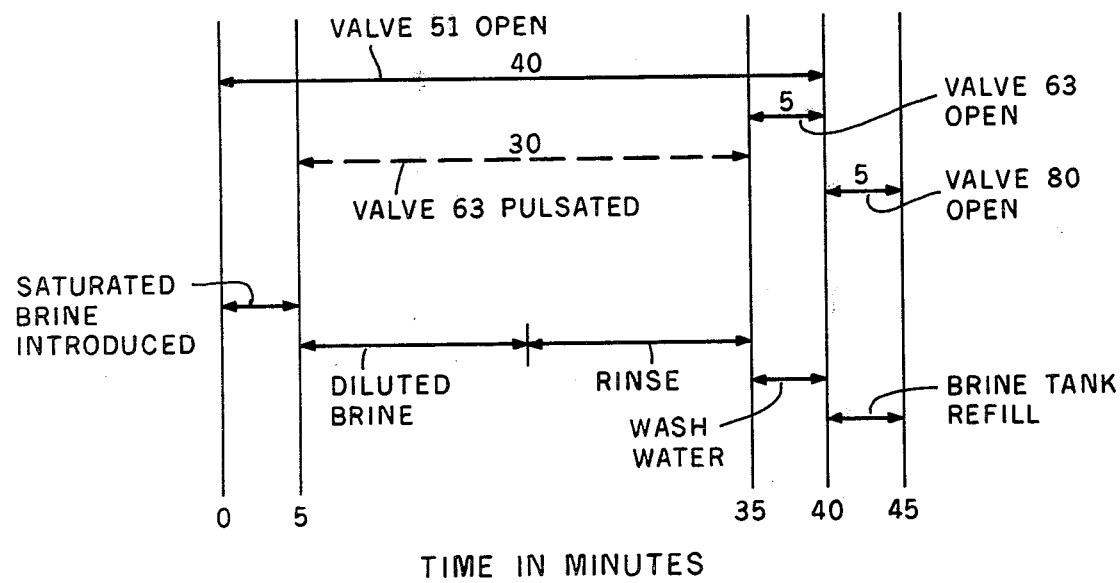

WATER SOFTENING SYSTEM

CROSS-REFERENCE TO RELATED APPLICATION:

This application is a continuation-in-part of copending application, Ser. No. 699,215, filed June 24, 1976, now U.S. Pat. No. 4,104,165, Aug. 1, 1978 entitled "Water Softening System."

BACKGROUND AND SUMMARY OF THE INVENTION:

This invention relates to ion-exchange and filter water systems and has particular reference to an improved method and means for controlling the flow of water and regenerative fluids through an ion-exchange resin bed, in such systems.

In ion-exchange water treatment systems which employ beds of synthetic resin for removing hardness factors, iron and turbidity from water supplied thereto, it has been the practice to recondition or regenerate the bed following a period of service with the brine which is erratic in its density or dilution because of fluctuating water pressures and back pressure of the bed as it is forced downwardly through the bed, flowing in the same direction as does water during the service cycle of operation. Water treatment systems which operate in the manner outlined above have certain undesirable characteristics which are especially manifest when used for treating water high in iron content. The downward flow of the regenerating solution causes iron oxide to accumulate and become trapped in the lower regions of the resin bed, thereby necessitating complete removal of the bed for cleaning purposes at frequent intervals.

The improved system provides for regenerating the mineral bed after a period of service whereby the minerals are restored to a higher degree of ion-exchange efficiency, the time required for the regeneration process is reduced, iron oxide particles are not retained and permitted to grow to the point where they clog the mineral bed.

The system provides for the use of treated water for the makeup of the brine solution, the treated water being introduced into the brine tank is such a way that the salt particles act as a filter for the saturated brine solution as it passes through the salt bed and to the mineral bed, whereby to prevent the entry of sand and other undesirable non-soluables that are normally found in various grades of salt, from entering into the treatment tank.

An improved control valve and brine induction provisions, which, under the dictates of a timer or sensor device and electrical solenoid valves controlled thereby, direct raw or untreated water downwardly through a bed of zeolites or other ion-exchange resins or minerals for a predetermined service period; or, with use of a device which senses the physical condition and hence the operating efficiency of the bed, cause regeneration of the bed to occur in a series of steps or cycles. In the brining and rinse cycle, diluted brine or regenerant is drawn into the treatment tank upwardly through the mineral bed. Following the brining and rinse operation, a wash cycle is introduced in the same counterflow direction to further remove any remaining traces of salt or other turbid matter from the top of the bed. This is followed by a fast down-flow rinse of the bed to further insure complete removal of all traces of foreign matter and to refill the brine tank with treated water. Then the system is restored to the normal service cycle wherein the raw water is caused to flow downwardly through the regenerated mineral bed.

In the water treatment system, control means maintains the drain valve means and the wash valve means open, and maintains the brine valve means closed in the brining and wash cycle for water flow from the raw liquid inlet port and through the aspirator in the plunger valve means to the drain port, and for concurrent brine flow from the brine tank inlet port to dilute the brine and provide a diluted brine flow through the mineral bed in the opposite direction to flow during the service cycle, and through the aspirator in the plunger valve means to the drain port.

The control means opens and closes the wash valve means intermittently during the brining and rinse cycle to provide a pulsating liquid flow through the mineral bed to introduce alternately an amount of saturated brine and rinse water controlling the rate of dilution through the mineral bed.

The control means maintains the wash means open during the last stage of the brining and wash cycle to provide a substantially constant flow of wash water through the mineral bed in the opposite direction.

The control means in one sequence of operation, under higher adverse water conditions, maintains the drain valve means open and the wash valve means closed during the initial stage of the brining and wash cycle for saturated brine flow in the said opposite direction through the mineral bed and to the drain port before the wash valve means is opened in a subsequent stage of the brining and rinse cycle.

The method of regenerating the water treatment system includes the steps of connecting the brine tank and raw liquid to a drain with means in the path causing diluted brine flow in the said opposite direction through the mineral bed during the brining and rinse cycle.

It is also advantageous in the method to pulse the liquid flow through the mineral bed during the brining and wash cycle and thereby introduce alternately an amount of saturated brine and wash or rinse water in the material bed at a controlled rate of dilution.

During the last stage of the brining and rinse cycle when the brine density has been reduced to substantially zero, the method includes the step of maintaining a substantially constant flow of wash water through the mineral bed in the said opposite direction.

In one sequence of operation, the method includes the step of connecting the brine tank to the drain during an initial stage of the brining and wash cycle causing saturated brine flow in the said opposite direction through the mineral bed before connecting the raw liquid to the drain for causing diluted brine flow in the same counterflow direction.

BRIEF DESCRIPTION OF THE DRAWING

FIG. 3 is a sectional view through the valve assembly, similar to FIG. 1, but with the main valve parts shown in positions for regenerating or brining the mineral bed;

FIG. 4 is a diagrammatic view of the entire unit with valve parts illustrated in their service position;

FIG. 5 is a view similar to that of FIG. 4 with the valve parts shown in their positions for introducing saturated brine;

FIG. 6 is a diagrammatic showing of the unit with valve parts illustrated in positions for introducing brine and water during intermittent or pulsing counterflow through the mineral bed;

FIG. 7 illustrates the system with valve parts shown in positions for purging the bed in a continuous counterflow direction through the mineral bed;

FIG. 8 illustrates the system with valve parts shown in position for effecting a concurrent flushing of the mineral bed and refilling the brine tank with treated water;

FIG. 9 is a diagram illustrating the sequence of operation for low to medium adverse water conditions, and FIG. 10 is a diagram illustrating the sequence of operation for medium to high adverse water conditions.

DESCRIPTION OF THE PREFERRED EMBODIMENT

Figure 2:
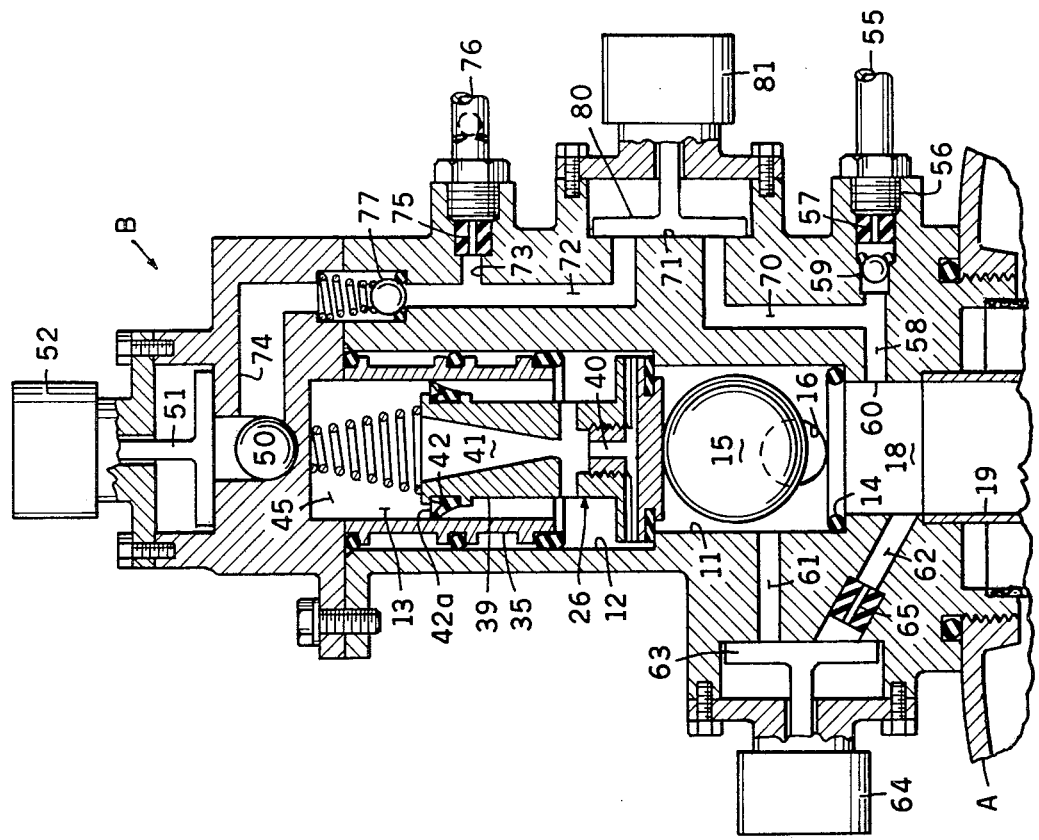
FIG. 2 is a vertical sectional view through the valve assembly with the main valve parts shown in their service position, as in FIG. 1, the plane of the section in FIG. 2 being at a right angle to that of FIG. 1.
Figure 1:
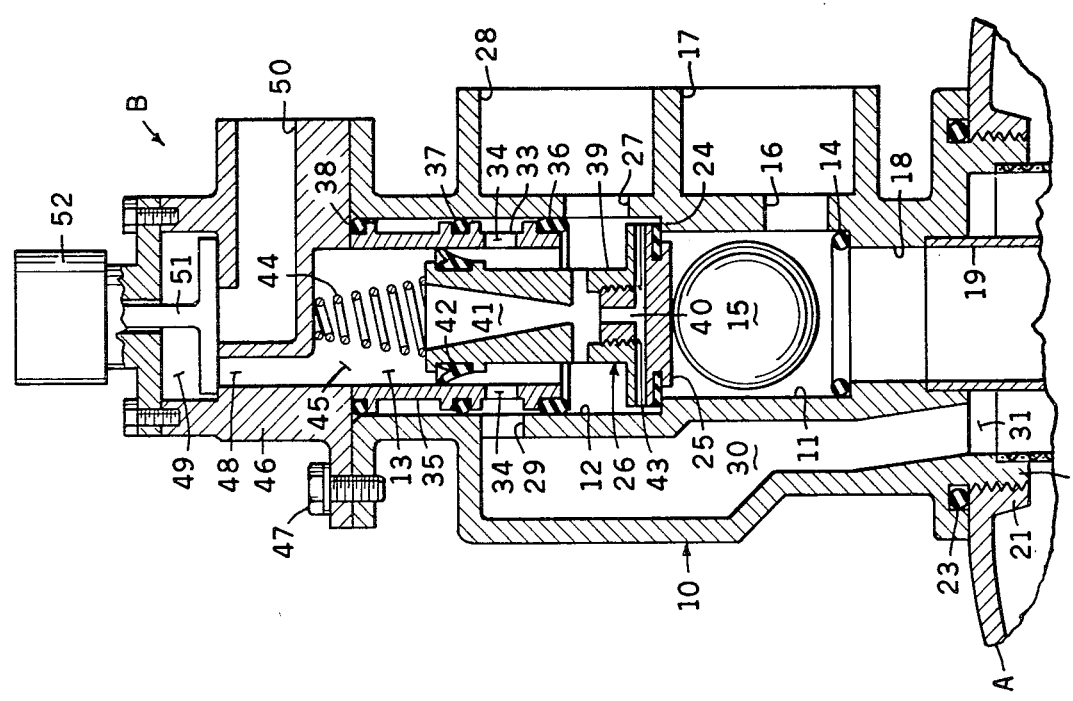
FIG. 1 is a vertical sectional view through the valve assembly and upper portion of the treatment tank upon which it is mounted, valve parts being shown in their normal or service positions.

The water treatment apparatus hereof comprises a vertically elongated treatment tank A which is surmounted by a unitary valve assembly indicated generally at B and shown in detail in FIGS. 1, 2 and 3. A control unit C controls the operation of solenoid valves of the valve assembly B. A separate tank or container for salt and brine is designated D. Resin tank A may be located above or below a sewer drain because by-products of the treatment process are discharged under pressure from the system, as will hereinafter be more fully explained. Tank A contains a bed of bead-like or granular ion-exchange resin or mineral, such bed desirably occupying from one-half to two-thirds of the volumetric capacity of the tank.

Referring now to FIGS. 1, 2 and 3 showing the valve assembly B in detail, this unit comprises a body member 10 formed to provide a series of vertical, coaxial, end-adjoining chambers of stepped diameter, 11, 12 and 13. The lowermost chamber 11 rises above an internal annular shoulder that supports an O-ring 14 which serves as a valve seat for a ball valve 15. An opening 16 in the wall of chamber 11, immediately above the valve seat 14, communicates with an outlet pipe nipple 17.

Extending axially downwardly from chamber 11 is a cylindrical passage 18 which continues downwardly through a stand-pipe 19 located centrally within tank A. Stand-pipe 19 terminates near the bottom of the tank and at the lower end of pipe 19 there is provided a slotted strainer head 20 which serves to retain ion-exchange granules in tank A periods of fluid upflow in pipe 19, and to distribute regenerant fluids evenly throughout the resin bed during periods of fluid downflow through pipe 19, conditions which occur during different operating cycles as will subsequently appear. Coacting threaded collars 21 and 22 respectively on the lower end of the valve body and the upper end of the tank A connect these parts together, and a sealing ring 23 interposed between mating flange surfaces of the valve body and tank top prevents leakage at the connection.

The middle chamber 12 rises above an annular inner shoulder 24 that provides a seat for the poppet valve-head 25 of a plunger valve assembly 26. When in the down position shown in FIGS. 1 and 2, poppet valve-head 25 seats on shoulder 24, whereby to prevent the direct passage of water between chambers 11 and 12. Chamber 12 has a lateral intake passage 27 located in a chamber wall closely above the valve seat shoulder 24. Passage 27 communicates directly with pipe nipple 28 formed integrally on the body part 10 immediately above the outlet nipple 17. Nipple 28 serves as a connection means for a service water pipe (not shown) that supplies raw or untreated water to the system.

A wall opening 29 above and on the side of chamber 12 opposite to opening or passage 27 connects that chamber 12 to the upper end of a vertical passageway 30, the lower end of which communicated with the interior of tank A at an opening 31 exteriorly of stand-pipe 19.

A sleeve member 35 is fixedly held in place within the upper end portion of body casting 10 by three sealing rings, 36, 37 and 38. The lowermost ring 36 protrudes below this lower end of sleeve 35 and provides a valve seat which is engageable by the upper perimetral surface of poppet valve head 25 when the latter is disposed in its uppermost position, as shown in FIG. 3. The upper ring 38 provides a seal between the body casting 10 and a head casting, to be hereinafter described. A number of radial wall passages 34 in sleeve 35 (FIGS. 1 and 2) have their outer ends opening to an annular groove 33 in the outer surface of the sleeve, which groove confronts and is in communication with opening 29 in the body casting.

Valve assembly 26 includes a stem portion 39 rising from the poppet head 25. The stem 39 is formed with a venturi passage extending vertically and concentrically therethrough which includes a nozzle element 40 arranged to direct a jet or stream vertically through an aspirator space and into the lower end of venturi throat 41. The upper or outlet end of throat 41 is directed into the chamber 13, which chamber is separated from lower chamber 12 by the flexible skirt 42a of a sealing ring 42 carried by the valve stem 39 near its upper end. The flexible skirt 42a of sealing ring 42 acts in the manner of a check valve that permits upward flow from chamber 12 to chamber 13 but prevents flow in the opposite direction.

The jet nozzle 40 is supplied with fluid under pressure from chamber 12 through radial passage 43 in the poppet head, the poppet head being suitably dimensioned to provide a passage space between it and the cylindrical wall of chamber 12. Whereas the plunger valve assembly is movable between upper and lower limit positions (FIGS. 3 and 1 respectively) by differences in fluid pressures acting on its upper and lower surfaces, as will be hereinafter explained, it is desirable to provide a compression spring 44 that acts downwardly on the valve in order to move the valve to its downward position when water pressures on the opposite end surfaces are substantially equal.

Chamber 13 opens upwardly into a cavity 45 formed in the underside of a head casting 46 which is secured to the body casting 10 by suitable cap screws, such as the one indicated at 47. A vertical passage 48 leads from cavity 45 and chamber 13 to a valve chamber 49. A drain passage 50 leads away from valve chamber 49 and is connected to a drain pipe, not shown, that leads to a sewer. Fluid flow from passage 48 to drain passage 50 is controlled by a solenoid actuated valve 51. When its solenoid 52 is energized, valve 51 moves to open position.

Numeral 55 (FIG. 2) designated a pipe through which saturated brine is forced by atmospheric pressure from brine tank D into the valve assembly B. Brine pipe 55 is joined by a threaded nipple 56 to passage 58 containing a flow control orifice 57 (FIG. 2) and a check valve 59 in passage 58 to communicate with chamber 18, and therethrough with the upper end of stand-pipe 19. Brine conduit 55 passes saturated brine from a point near the bottom of the tank D, the inlet passage to pipe 55 being controlled by a float valve assembly 60 which closes the inlet end of line 55 when brine in tank D drops below a predetermined level, as appear in FIG. 6.

For purposes of diluting the brine strength proportionately and cleansing the mineral bed during the brining and rinse cycle, water is introduced intermittently into the upper end of the stand-pipe 19 and caused to flow downwardly therethrough, outwardly through strainer head 20, upwardly through the resin bed and thence through the valve assembly to the drain, as will be hereinafter more fully explained. The brining and wash cycle occurs with ball valve 15 seated on its valve seat sealing ring 14, as shown in FIG. 3. A by-pass passage 61-62 (FIG. 2) from chamber 11 to the upper end of stand-pipe 19 is controlled by a solenoid valve 63, which opens in response to energization of its associated solenoid 64. A flow control orifice element 65 is desirably installed in passage 62. Element 65 serves to regulate the water flow rate during the brining and wash cycle.

Again, with reference to FIGS. 2 and 8, valve means and passages are shown whereby a final, concurrent-flow rinsing of the mineral bed is obtained and simultaneously, the brine tank is refilled with water to prepare saturated brine for a subsequent bed regenerating operation. Numeral 10 designates a water passageway in a side wall of the body member which provides a connection between the brine passage 58 and a valve chamber 71. An exit passage 72 from valve chamber 71 leads to two branch passages 73 and 74. Branch line 73 has a flow control orifice element 75 therein, and is connected to a brine tank refill pipe 76 leading to the brine tank D. The branch passage 74 leads to drain passage 50 and is provided with a check valve 77 to assure unidirectional flow toward drain 50, preventing back flow from the drain into the system. Fluid flow in the passage 70-72 is controlled by a valve member 80 in chamber 71. This valve member is normally disposed in passage closed position and is actuated to open position as shown in FIG. 2 by the energization of solenoid 81.

OPERATION

With special reference to FIG. 4, the system is conditioned for normal service operation by the closing of the solenoid flow control valves 51, 63 and 80, effected by suitable switching means in the control means C. The control means may include timing mechanism, supplemented by sensor means, for controlling valve operation responsively to the physical or chemical state of the mineral bed.

SERVICE CYCLE

With reference to FIGS. 1 and 4, during a service cycle of operation, raw water flows through an inlet opening 27 (FIG. 1) into the middle chamber 12 of the valve assembly. The water passes upwardly between the stem 26 of the plunger and sleeve 35, thence outwardly through a ring of peripheral openings 34 in the sleeve and an opening 29 that leads into the passage 30 wherein it descends into the treatment tank A through opening 31. The raw water then percolates downwardly through the mineral bed, loosing its hardness factors by the ion-exchange process, and enters the screening head 20 at the lower end of the stand-pipe 19. Traveling upwardly through stand-pipe 19 the treated water raises valve ball 15 from its seat 14, and the treated water exits from the system through the outlet port 16.

During this service cycle the plunger valve 26 is held in its downward position as shown in FIG. 1 by water pressure in chamber 12 being greater than that in the underlying chamber 11 due to a drop in pressure as the water passes through the mineral bed. Fluid above the flexible sealing ring 42 is static (valve 51 being closed) and tends only to increase the downward pressure of the poppet head and seal 25 on the valve seat shoulder 24.

BRINING, RINSE AND WASH CYCLES

The brining and wash cycle is initiated in response to the timer or sensor device of the control means C which causes solenoid 52 to become energized, thereby opening drain valve 51. (Solenoid valves 64 and 81 remain closed). This releases water from upper chambers 13, 48 and 49 to drain passage 50, causing a lowering of water pressure in these chambers below the pressure being exerted on the underside of the valve. This causes the plunger assembly to be raised to its upper position shown in FIG. 3. The seating of the poppet head on the sealing ring 36 closes off flow of water through the plunger except for such water that enters the orifice nozzle 40 and exits therefrom as a jet stream, passing through the venturi throat and into chamber 45 and thence to drain passage 50. This high pressure jet of water, discharging into and through the venturi throat creates negative pressure at the opening 29 which then becomes an intake port for fluid drawn from the treatment tank. As regenerant is forced by atmospheric pressure out of the treatment tank the lowered pressure in stand-pipe 19 causes check valve 15 to become seated on sealing ring 14, and held in closed position by water pressure from above. As appears in FIG. 3, inlet passage 27, chamber 12, chamber 11 and outlet passage 16 form a short circuit by-pass for raw or untreated water which will be available from service faucets during the regeneration process.

The above described aspirative effect of the venturi means creates a negative pressure in the tank of resin and inducts saturated brine from the brine tank through pipe 55, open check valve 59, port 60 in sub-chamber 18, stand-pipe 19 and distributor 20. The brine percolates slowly upwardly through the mineral bed displacing the residual water in the bed through passage 30, port 29 at the upper end of passage 30, and into and through the venturi throat. This displaced water is discharged at a relatively high velocity through the open valve chamber 49 to the drain passage 50.

During the rinse cycle, the control means C causes solenoid valve 63 to open and close intermittently, and drain valve 52 to remain open. The intermittent opening of solenoid valve 63 allows a slow controlled rate of flow of water to flow from chamber 11 through passages 61 and 62 (FIG. 2) into and downwardly through stand-pipe 19 diluting the saturated brine at a controlled rate, thence upwardly through the mineral bed and through the drain passage 50. The flow control element 65 has a restricted bore passage that controls the flow regardless of pressure fluctuations, thereby stabilizing the rate of dilution of the brine for maximum effect. As the brine dilution reaches a point of zero density, solenoid valve 63 is energized continuously with the same flow pattern except that the continuous flow increases the gallons per minute, expands the bed and enables the individual beads and/or granules to be well washed, hydraulically classified and reused free of turbidity.

The flexible character of the sealing ring 42 accommodates the flow of brine and wash water out of the system during this cycle. Thus, the upwardly directed skirt portion 42a of the sealing ring 42 becomes displaced inwardly by underlying water pressure, increasing the passage area around the plunger stem if necessary to accommodate the flow.

It will be understood that during the brining, rinse and wash cycles, the plunger valve 26 is in an elevated position as appears in FIG. 3, providing a direct connection between the raw water inlet passage 27, chambers 12 and 11, and outlet passage 26. Accordingly, water will be available in the service pipes during the brining, rinse and wash cycles, although the water supplied during this period will be untreated since it does not pass through the mineral bed.

FIG. 9 illustrates the sequence of operation for low to medium adverse water conditions, i.e., conditions in which exist approximately 5-25 grains hardness with 2 ppm iron. Under these conditions, it will be understood that the drain valve 51 and solenoid 63 are opened simultaneously as suggested in FIG. 7, so that an initial backwash upflow countercurrent to the service flow through the material bed will loosen the bed, purge it of foreign matter on top of the mineral and prepare it to receive the regeneration brine.

After the first stage backwash of diluted brine, the valve 63 is opened and closed intermittently, as suggested by FIG. 6, to provide a slow rinse pulsing upward flow of rinse water through the mineral bed. Such intermittent opening and closing of valve 63 may be accomplished by the provision of a so-called bi-metal flasher switch in the supply circuit for solenoid 64. The pulsing operation of valve 63 is discontinued after a predetermined length of time, as controlled by the timer device of the control means C, through a subordinate switch that closes a shunt circuit around the flasher switch. For example, the valve 63 will be closed for a short period of time, i.e., four (4) seconds, to provide a negative pressure in the material bed to draw in a small amount of saturated brine, and then the valve 63 is opened for a shorter period of time, i.e., one (1) second, to dilute the brine and force the brine upflow through the material bed. This pulsing action alternately pressurizes and depressurizes the material bed. By regulating the pulsing circuit, the rate of dilution and rinse can be adjusted for all degrees of efficient operation. The pulsing operation is continued for a predetermined length of time during this second stage of the brining and washing cycle for a predetermined time, i.e., thirty (30) minutes.

This dilution of the brine strength proportionately as illustrated by the sequence of operation in FIG. 9 prevents the dehydration of the resin particles which causes them to shrink and present less surface for exchanging the weaker concentrations. Consequently, by diluting the brine proportionately, the resin remains expanded and presents a much greater surface for the exchange, thereby increasing the ratio of hardness removed to salt consumed. For example, it has been found that by diluting the brine about 50% in the manner described above, the efficiency of hardness removal has been increased almost double from 2000 to 4000 grains of hardness removed per pound of salt used.

FIG. 10 illustrates the sequence of operation for medium to high adverse water conditions, i.e., water conditions in which exist approximately 25 to 100 grains hardness and 25+ ppm iron. Under these higher adverse water conditions, it would be more advantageous to keep the valve 63 closed as suggested in FIG. 5 during the initial stage of the brining cycle so that saturated brine is introduced only during the initial stage for approximately five (5) minutes before the valve 63 is then opened and water is introduced in a pulsing operation to provide a dilution of the brine during the second stage of the brining and rinse cycle as described previously. Saturated brine introduced in a backwash during the initial stage has proven to be very efficient in removing high concentrations of iron hardness and other heavy metals with a minimum usage of salt or other regenerates.

During the third and final stage of the brining, rinse and wash cycles, valve 63 is maintained open for a predetermined period of time, i.e., five (5) minutes, so as to provide a fast, uninterrupted stream of wash water upwardly through the material bed, so that the freed particles and turbidity is carried quickly to the drain, as suggested by FIG. 7.

RINSE AND BRINE TANK REFILL

In the final stage of bed regeneration solenoid valves 51 and 63 are closed and solenoid valve 80 is open, as suggested in FIG. 8. With the valves positioned in this manner water enters the treatment tank above the resin bed, flows downwardly through the bed to remove therefrom any remaining salinity traces. This concurrent or downflow rinsing operation tends to compact or concentrate the bed, which has been expanded by the previous counterflow brining and flushing operations, thusly conditioning the bed for the subsequent service and filtering cycle.

During the final rinse cycle, the brine tank is refilled with soft water from the treatment tank. The flow paths are as follows: closing valves 51 and 63, and opening valve 80 effects a slight reduction of pressure on the underside of the plunger 26. Spring 44 initiates downward movement of the plunger and causes it to resume its downward, service position shown in FIG. 2. Consequently, raw water flows into the treatment tank through passage 30, as it does during the service cycle, thence downwardly through the resin bed and upwardly through standpipe 19 to chamber 18 (FIG. 2). With valve 80 open, the treated water moves through passages 58, 70, 71, 72 and into passage 73 leading to brine tank refill pipe 76. After the brine tank has been refilled, any excess flow prior to the closing of valve 80 is discharged through check valve 77 to passages 74 and 50 to the drain. Closing of solenoid valve 80 responsively to the timer or sensor device of control means C conditions the system for normal service operation.

I claim as my invention:

1. In a water treatment system having a treatment tank and an ion-exchange mineral bed therein, and a brine tank, regeneration control apparatus comprising:
    (a) a plunger valve means including an aspirator for producing a flow of fluid;
    (b) a raw liquid inlet port, and a treated liquid outlet port, (c) a first conduit means connecting the raw liquid inlet port to the top of the treatment tank in a first position of the plunger valve means, (d) a second conduit means connecting the treated liquid outlet port to the lower interior of the treatment tank, (e) a drain port and a drain valve means for opening or closing the drain port, the drain port being connected to the first conduit and the raw liquid inlet port through the aspirator in the plunger valve means in a second position of the plunger valve means when the drain valve means is opened, (f) a third conduit means connecting the raw liquid inlet port to the second conduit means, (g) a wash valve means for opening or closing the third conduit means, (h) a brine tank inlet port and a brine tank outlet port, and separate conduit means connecting each of the last said ports separately to the brine tank to provide one conduit means for delivering brine from the brine tank and another separate conduit means for delivering treated liquid to the brine tank, (i) a fourth conduit means connecting the brine tank inlet and outlet ports to the second conduit means, (j) a brine valve means in the fourth conduit between the brine tank inlet and outlet ports for controlling flow therethrough, (k) control means maintaining the drain valve means, wash valve means and brine valve means closed in the service cycle for water flow from the raw liquid inlet port, through the first and second conduit means and in one direction through the mineral bed, and through the treated liquid outlet port, (l) the control means maintaining the drain valve means and wash valve means open, and the brine valve means closed in the brining, rinse and wash cycles for water flow from the raw liquid inlet port and through the aspirator in the plunger valve means to the drain port, and for concurrent brine flow from the brine tank inlet port, through the fourth, second and first conduit means, and for concurrent water flow from the raw liquid inlet port, through the second and first conduit means to dilute the brine and provide a diluted brine flow through the mineral bed in the said opposite direction and to the drain port, and (m) the control means maintaining the drain valve means and the wash valve means closed and the brine valve means open in the rinse and brine tank refill cycle for liquid flow from the raw liquid inlet port, through the first, second and fourth conduits, and to the brine tank outlet port.

2. A regeneration control apparatus as defined in claim 1, in which:

(n) the control means opens and closes the wash valve means intermittently during the brining and rinse cycle to provide a pulsating liquid flow through the mineral bed to introduce alternately an amount of saturated brine and diluted brine into the bed in said opposite direction.

3. A regeneration control apparatus as defined in claim 2, in which:

(o) the control means maintains the wash valve means open during the last stage of the brining and wash cycle to provide a substantially constant flow of wash water through the mineral bed in said opposite direction.

4. A regeneration control apparatus as defined in claim 1, in which:

(n) the control means maintains the drain valve means open and the wash valve means closed during an initial stage of the brining cycle for brine flow from the brine tank inlet port, through the fourth, second and first conduit means and in said opposite direction through the mineral bed and to the drain port before the wash valve means is open in a subsequent stage of the brining, rinse and wash cycles.

5. A method of regenerating a water treatment system having a treatment tank and an ion-exchange mineral bed therein, and a brine tank, comprising the steps of:

(a) connecting the raw liquid to a water supply system with means in a path for causing a flow in one direction through the mineral bed during a service cycle, (b) connecting the brine tank and raw liquid to a drain with means in the path causing diluted brine flow in an opposite direction through the mineral bed during the brining, rinse and wash cycles, and (c) connecting the raw liquid to the brine tank with means in the path for causing liquid flow in the said one direction through the mineral bed during a rinse and brine tank refill cycle.

6. A method of regenerating a water treatment system as defined in claim 5, including the step of:

(d) pulsating the liquid flow through the mineral bed during the brining and rinse cycle to introduce alternately an amount of saturated brine and diluted brine into the bed in said opposite direction.

7. A method of regenerating a water treatment system as defined in claim 6, including the step of:

(e) maintaining a substantially constant flow of wash water through the mineral bed in said opposite direction during the last stage of the brining and wash cycle.

8. A method of regenerating a water treatment system as defined in claim 5, including the step of:

(d) connecting the brine tank to the drain during an initial stage of the brining cycle for causing saturated brine flow in said opposite direction through the mineral bed before connecting the raw liquid to the drain for causing diluted brine flow in said opposite direction.

* * * * *